United States Patent [19]

Schwetz et al.

[11] Patent Number: 4,803,183

[45] Date of Patent: Feb. 7, 1989

[54] DENSE MOLDED BODIES OF POLYCRYSTALLINE ALUMINUM NITRIDE AND PROCESS FOR PREPARATION WITHOUT USE OF SINTERING AIDS

[75] Inventors: Karl-Alexander Schwetz, Sulzberg; Wolfgang Grellner, Kempten; Klaus Hunold, Lauben; Max Mohr, Kempten; Alfred Lipp, Bad Worishofen, all of Fed. Rep. of Germany

[73] Assignee: Elektroschmelzwerk Kempten GmbH, Munich, Fed. Rep. of Germany

[21] Appl. No.: 17,776

[22] Filed: Feb. 20, 1987

[30] Foreign Application Priority Data

Mar. 13, 1986 [DE] Fed. Rep. of Germany ....... 3608326

[51] Int. Cl.$^4$ ............................................. C04B 35/58
[52] U.S. Cl. ........................................ 501/96; 501/98; 264/65
[58] Field of Search .................................. 501/96–98; 264/65, 66

[56] References Cited

U.S. PATENT DOCUMENTS

| | | | |
|---|---|---|---|
| 4,435,513 | 3/1984 | Komeya et al. | 501/96 |
| 4,578,364 | 3/1986 | Huseby et al. | 501/96 |
| 4,615,863 | 10/1986 | Inoue et al. | 501/96 |
| 4,618,592 | 10/1986 | Kiramoto et al. | 501/96 |
| 4,650,777 | 3/1987 | Kurokawa et al. | 501/96 |
| 4,672,046 | 6/1987 | Sawamura et al. | 501/98 |

Primary Examiner—William R. Dixon, Jr.
Assistant Examiner—Ann M. Knab
Attorney, Agent, or Firm—Burgess, Ryan & Wayne

[57] ABSTRACT

The invention is a molded body of polycrystalline aluminum nitride having a density of at least 99.8% TD and comprising:
  at least 99% by weight AlN
  up to 0.35% by weight residual oxygen
  up to 0.35% by weight residual carbon and
  up to 0.03% by weight metallic impurities (Fe, Si, Ca, Mg).

In the molded body, the aluminum nitride is present in the form of a single phase, homogeneous, isotropic microstructure having a maximum grain size of 5 μm. The residual oxygen and the residual carbon are present in the form of a solid solution in the aluminum nitride lattice and caromografically not detectable as separate phase(s) up to a magnification of 2400 times. The molded bodies have a bending strength measured according to the 4-point method, at room temperature and up to about 1400° C., of at least 500 N/mm$^2$, a predominantly transcrystalline rupture modulus and a thermal conductivity at 300 K of at least 150 W/mK. The molded body is produced from a porous, deoxidized green body having a maximum density of 70% TD and the same chemical composition as the final product, by isostatic hot pressing in a vacuum sealed casing at a temperature of from 1700° to 2100° C. and a pressure of from 100 to 400 MPa in a high-pressure zone using an inert gas as a pressure transmitting agent.

2 Claims, No Drawings

DENSE MOLDED BODIES OF POLYCRYSTALLINE ALUMINUM NITRIDE AND PROCESS FOR PREPARATION WITHOUT USE OF SINTERING AIDS

Polycrystalline bodies of aluminum nitride are known. They are characterized by a combination of valuable properties such as high strength, resistance to oxidation, resistance to thermal shock, high thermal conductivity, low electrical conductivity and resistance to corrosion by liquid metals. Due to this combination of properties, they can be used in many different fields. They are particularly useful as construction materials in high-temperature machinery and as substrate materials in high-efficiency electronic devices.

BACKGROUND OF THE INVENTION

The known polycrystalline aluminum nitride molded bodies however, have in part less desirable properties than pure aluminum nitride. The properties depend to a great extent on the amount of impurities that are present in the molded body and particularly, the amount of oxygen, carbon and metals present. For example, the theoretical value of the thermal conductivity of pure, monocrystalline aluminum nitride is 320 W/mK, which drops to about 50 W/mK as the oxygen content increases. Still lower values are obtained on further increase of the oxygen content or in two-phase aluminum nitride ceramics (see G.A. Slack in J. Phys. Chem. Solids (1973), Vol. 34, pp. 321–335; ref. in C.A. Vol. 78 (1973), No. 129,310 r).

The strength at high temperatures also depends on the impurities present in the molded body. The bending strength drops sharply at temperature above 1000° C. in comparison to the value measured at room temperature which is ascribed to the presence of oxygen-containing phases at the grain boundaries in the aluminum nitride sintered body.

Pure aluminum nitride does not sinter easily because of its predominantly covalent bonding. In order to obtain high density bodies, it was deemed necessary either to start from aluminum nitride powders rich in oxygen or to add sintering aids preferably metal oxides which aid compression during hot pressing. It is possible to obtain from aluminum nitride powder having an oxygen content of 1.0% by weight, (2.1% by weight based on $Al_2O_3$) by axial hot pressing, a molded body of aluminum nitride with 98% theoretical density (hereinafter abbreviated as % TD), which at room temperature has a bending strength of 265 N/mm$^2$ and which at 1400° C. dropped to 125 N/mm$^2$ (see DE-A-14 71 035 corresponding to U.S. Pat. No. 3,108,887).

By hot pressing commercially available aluminum nitride powders at 2000° C., sintering densities of 97 to 99% TD were obtained. The purest of the polycrystalline aluminum nitride molded bodies thus produced contained 0.9% by weight oxygen, had a density of 97% TD and a thermal conductivity of 66 W/mK (see G.A. Slack et al. in Amer. Ceram. Soc. Bull. (1972) Vol. 71, pp. 852 to 856; ref. in C.A. Vol. 78 (1973) No. 19686 K and DE-A-20 35 767).

Polycrystalline aluminum nitride molded bodies produced by hot pressing commercially available aluminum nitride powder without sintering aids at a hot pressing temperature of 1700° C., had 0% porosity, contained 0.8% by weight oxygen and had a bending strength of 375 N/mm$^2$, measured according to the 3-point method at room temperature, which at 1300° C. dropped to about 225 N/mm$^2$ (see P. Boch et al. in Ceram, Int. 1982, Vol. 8 (1), pp. 34–40; ref. in C.A. Vol. 97(1982) No. 59846 m).

It has been reported from Japan, in relation to metallic impurities, that it is possible to hot press high-purity aluminum nitride powders without sintering aids at temperatures of 2000° C. to form dense transparent bodies. Physical data were given only for monophase aluminum nitride bodies produced with an admixture of 0.5 percent by weight calcium oxide as a sintering aid and containing from 0.5 to 0.7% by weight oxygen. A hot pressed aluminum nitride body had a density of 99.6% TD, a thermal conductivity of 91 W/mK and a bending strength of 510 N/mm2 measured at room temperature according to the 3-point method. A pressureless sintered aluminum nitride body had a density of 99.1% TD and a thermal conductivity of 95 W/mK (see N. Kuramoto et al. in J. Mater. Sci. Lett. 1984, Vol. 3 (6), pp. 471–474; ref in C.A. Vol. 101 (1984), No. 42402s).

Aluminum nitride molded bodies produced by conventional hot pressing methods, with biaxial application of pressure, have an anisotropic microstructure so that their properties depend on direction.

Since only bodies of simple shape can be produced by a hot pressing process, pressureless sintering processes have been developed for the production of polycrystalline aluminum nitride molded bodies. Pressureless sintering processes for aluminum nitride require use of sintering aids to obtain high sintered densities. Numerous compounds have been tested for promoting sintering of aluminum nitride. Especially effective are oxides of elements from the 2nd and 3rd group of the Periodic System including the lanthanides (see K. Komeya et al. in Yogyo Kyokaishi; 1981, Vol. 89 (6), pp. 330–336; ref. in C.A. Vol. 95 (1981), No. 155257 z).

Due to the sensitivity of aluminum nitride to impurities, in particular oxygen impurities, it is necessary to use the least possible amounts of oxygen containing sintering aids or to reduce, by additional processing steps, the oxygen present in the aluminum nitride powder and/or the oxygen introduced by the sintering aids.

According to the process disclosed in U.S. Pat. No. 4,435,513, a mixture of commercially available aluminum nitride powders having an oxygen content of not more than 5% by weight, together with up to 5.66% by weight of alkaline earth oxide sintering aids with up to 6.54% by weight carbon in the form, for example, carbon black or a carbonizable organic material such as sugar or phenolic resin were pressureless sintered at temperatures of up to 2000° C. The carbon in the mixture prevents the formation of aluminum oxide nitride phases and the amount of oxygen present in the starting aluminum nitride powder is reduced. As can be seen from the examples, the aluminum nitride molded bodies produced had a density of 98.5% TD and a thermal conductivity of 63 W/mK. By a subsequent hot isostatic pressing treatment, the density could be increased to 99% TD and the thermal conductivity to 71 W/mk.

According to the process disclosed in EP-A-147 101, aluminum nitride powders containing 0.001 to 7% by weight oxygen mixed with 0.01 to 15% by weight oxides of rare earth metals were hot pressed or sintered without pressure. It is believed that the oxygen present in the aluminum nitride starting powder reacts with the oxides of the rare earth metals (preferably $Y_2O_3$) forming compounds (phases) having a garnet or Perowskite structure so that oxygen does not diffuse into the aluminum nitride lattice with formation of mixed crystals or aluminum oxy-nitride phases (AlN polytypes). The garnet or Perovskite phases are formed during sintering at relatively low temperatures (1000° to 1300° C.), they melt at high temperatures (1600° to 1950° C.) and induce a liquid-phase sintering that results in dense bodies. As can be seen from the examples, the best results with regard to thermal conductivity were obtained with aluminum nitride bodies prepared from aluminum nitride powders having oxygen contents of 0.3 to 1.0 percent by weight with admixture of 0.1 to 3.0% by weight $Y_2O_3$ which were pressureless sintered at 1000° C. For an aluminum nitride (AlN) body with the relatively high oxygen content of approximately 0.9% by weight (0.6% by weight from the AlN powder +about 0.3 by weight oxygen from the 1.5% by weight $Y_2O_3$), the highest heat conductivity given in all the examples was 135 W/mK. By X-ray diffraction analysis there were detected in these bodies, together with the main aluminum nitride phase, small amounts of an Al-Y garnet phase and an aluminum oxynitride phase, which are present as oxidic impurities at the aluminum nitride grain boundaries.

According to the process disclosed in EP-A-13 32 75 (corresponding to U.S. Pat. No. 4,478,785 and U.S. Pat. No. 4,533,645), it was disclosed that sintering aids were not necessary and only a carbon-containing material was used. Commercially available aluminum nitride powders of high purity, with regard to metallic impurities, and containing approximately 1.5 to 3.0% by weight oxygen were partially deoxidized by adding carbon so that the aluminum nitride powders or the green body prepared therefrom still contained, after the deoxidation treatment by heating, a residual oxygen content of from about 0.35 to about 1.1% weight. The high residual oxygen content is necessary for pressureless sintering, at temperatures in the range of 1900° to 2200° C., to sintered densities of more than 85% TD in resulting sintered bodies. Accordingly, the finished aluminum nitride sintered bodies have a residual oxygen content in the range of about 0.35 to about 1.1% by weight and a residual carbon content in detectable amounts as low as about 0.2% by weight. The sintered bodies of aluminum nitride prepared by the process are stated to be free of secondary phases which is understood to mean that they contain less than about 1% by volume secondary phases (that is, phases other than AlN). As can be seen from the examples, however, the lack of sintering aids produces sintered bodies with final densities in the range of 91.6 to 97.2% TD and relatively high residual oxygen contents. In addition, despite the use of an aluminum nitride starting powder of high purity in relation to metallic impurities, the thermal conductivity values at room temperature were at a maximum of only 82 W/mK.

According to the process disclosed in EP-A-15 25 45, the improvement in thermal conductivity is obtained, by using for deoxidation of the aluminum nitride, an admixture containing yttrium such as yttrium metal, yttrium hydride and/or yttrium nitride instead of carbon. The yttrium reacts with the oxygen present in the aluminum nitride forming liquid phases containing yttrium and oxygen, which, at the same time act as sintering aids in the pressureless sintering step. After cooling, these phases remain in the aluminum nitride sintered body as secondary phases at the grain boundaries of the aluminum nitride. The composition according to point F in the phase diagram, has the smallest amount of these secondary phases, and corresponds to 1.6 equivalent percent Y and 3.2 equivalent percent oxygen, which corresponds to 6.2% by weight of a $YAlO_3$ secondary phase, or, differently expressed, to 1.81% by weight oxygen and 3.36% by weight Y in the AlN sintered body. As it can be seen from the examples, the highest value for thermal conductivity was 174 W/mK for an AlN sintered body containing $Y_2O_3$ and $Y_4Al_2O_9$ as secondary phases.

As can be seen from the extensive prior art, it has not hitherto been possible to produce polycrystalline aluminum nitride bodies having a high density that do not contain substantial amounts of impurities such as oxygen, carbon and/or metals, which unfavorably affect the thermal conductivity by changing the lattice parameters of the aluminum nitride crystals and/or unfavorably affect resistance to high temperatures by inclusion of impurity containing phases at the grain boundaries of the aluminum nitride crystals.

BRIEF SUMMARY OF THE INVENTION

The problem is to provide molded bodies of polycrystalline aluminum nitride which are dense, substantially poreless and of high purity which have improved thermal and mechanical properties and therefore have a broad range of uses as construction materials in high-temperature machine construction and as substrate materials in high-efficiency electronics. In addition, a process whereby those molded bodies can be economically and reproducibly manufactured with the desired properties without use of sintering aids is required.

According to the invention, the problem is solved by providing a dense substantially non-porous molded body of polycrystalline aluminum nitride having a density of at least 99.8% TD calculated on the theoretically possible density of pure aluminum nitride and consisting of at least 99% by weight aluminum nitride,
up to 0.35% by weight residual oxygen,
up to 0.35% by weight residual carbon and
up to 0.30% by weight total of metallic impurities (Fe, Si, Ca, Mg)

wherein the aluminum nitride is present essentially in the form of a single, homogeneous, isotropic microstructure with a grain size not larger than 5 μm; the residual oxygen and residual carbon are present in the form of a solid solution in the AlN lattice and at an magnification of up to 2,400 times, they are not ceramically detectable as separate phase(s), having the following properties: a bending strength (measured according to the 4-point method) from room temperature to about 1400° C. of at least 500 N/mm², a predominantly transcrystalline rupture modulus and thermal conductivity at 300 K of at least 160 W/mK.

The molded bodies according to the invention are prepared from porous deoxidized green bodies having a maximum density of 70% TD and consisting of at least 99% by weight aluminum nitride,
up to 0.35% by weight residual oxygen,
up to 0.35% by weight residual carbon and
up to 0.30% by weight total of metallic impurities (Fe, Si, Ca, Mg)

by isostatic hot pressing in a vacuum sealed casing at a temperature of from 1700° to 2100° C. and a pressure of from 100 to 400 MPa in a high-pressure zone using an inert gas as a pressure-transmitting agent.

Since nothing can escape during the isostatic hot-pressing operation due to the gas tight casing present, the molded bodies according to the invention have at least 99.8% TD, preferably 100% TD, and the same chemical composition as the porous deoxidized green bodies with a maximum 70% TD.

DETAILED DESCRIPTION OF THE INVENTION

The molded bodies according to the invention, made of polycrystalline aluminum nitride, have a single phase microstructure in which the individual AlN grains having a maximum grain sizes of 5 $\mu$m are distributed uniformly, that is, homogeneously and independently of direction. The residual oxygen and residual carbon are essentially in the form of a solid solution in the aluminum nitride lattice and cannot be detected as a separate phase or phases by x-ray diffraction or by ceramographic techniques at magnifications of up to 2400 fold. The metallic impurities, however, can be detectable in the form of particulate segregations in sizes of $\leq 0.5$ $\mu$m.

For the production of the deoxidized green bodies, it is preferable to use as the AlN starting material, a powder having a maximum particule size of 5 $\mu$m, preferably 2 $\mu$m, and an average particle size of $<1$ $\mu$m, preferably $<0.5$ $\mu$m, with a specific surface of from 4 to 10 $m^2/g$ (measured according to BET) and a purity of at least 99.8%, preferably 99.9%, calculated on the metallic impurities. Metallic impurities are to be understood to mean all metallic elements (essentially Fe, Si, Ca and Mg), with the exception of the aluminum present in bonded form, which can be present in AlN powders.

The adherent carbon present in commercially available AlN powder can be tolerated to a maximum of 0.2% by weight. The residual oxygen which as a result of the known tendency of the finely divided AlN powder to hydrolyze (according to $AlN + 3H_2O \rightarrow NH_3 + Al(OH)_3$) is present as the main impurity mostly in the form of the hydrolysis product $Al(OH)_3$, can be tolerated up to a maximum of 4.0% by weight.

The aluminum nitride starting powders in admixture with small amounts of free carbon or a material which forms carbon on heating is compacted to form pre-molded green bodies and then subjected to a heat treatment, which is a purifying deoxidizing annealing at 1600° to 1800° C. to a nitrogen atmosphere, to form deoxidized green bodies with a maximum density not exceeding 70% TD.

The carbon-containing admixture for the preparation of the deoxidized green bodies can be formed in any manner that ensures a uniform distribution of the carbon in the AlN-C mixture, for instance, by admixture of the AlN with particulate carbon black or colloidal graphite with a specific surface in the range of from 10 to 400 $m^2/g$. To obtain good pressing properties of the powder mixtures containing carbon black or colloidal graphite, it is preferable to use small amounts of a temporary binder such as camphor or stearic acid. The temporary binders are preferably used in amounts of up to a maximum of about 3% by weight calculated on the resulting mixture. The admixture containing carbon preferably contains an organic material that can be carbonized at temperatures of up to about 1000° C. forming carbon. Examples of preferred organic materials are condensation products of phenol formaldehyde of the Novolak and Resole type which are carbonized in the range of from 100° to 900° C. forming amorphous carbon in yields of 35 to 50%.

For determining the amount of carbon to be admixed with the starting aluminum nitride powder, the free carbon present in the aluminum nitride starting powder has to be taken into consideration. The total amount of the free carbon present in the compacted powder mixture, after carbonizing the organic material if an organic material is used, is critical for carrying out the process and for obtaining the advantageous properties of the sintered bodies of the invention. It has been found that more carbon must be used than is stoichiometrically required for deoxidation of the oxygen impurities present in the aluminum nitride powder. As a calculation basis for determining the stoichiometrically required amount of carbon, the following chemical equation for the carbothermal reduction of aluminum hydroxide in a nitrogen atmosphere can be used.

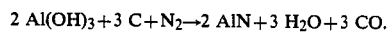

$$2\ Al(OH)_3 + 3\ C + N_2 \rightarrow 2\ AlN + 3\ H_2O + 3\ CO.$$

However, the value thus calculated is an approximate value since the oxygen in the aluminum nitride powder as a rule is not present completely as $Al(OH)_3$ but partly as physically or chemically absorbed water, as oxygen dissolved in the aluminum nitride lattice and as aluminum oxide ($Al_2O_3$).

The amount of the carbon admixed with the AlN powder is preferably used in an amount sufficient to lower the oxygen content in the preoxidized green body to less than 0.35% by weight residual oxygen but which at the same time does not increase the carbon content of the deoxidized green body to more than 0.35% by weight residual carbon. The addition of a insufficient amount of carbon results in deoxidized green bodies having more than 0.35% by weight oxygen; the addition of too large amounts of carbon results in deoxidized green bodies having more than 0.35% by weight carbon; in either case, the properties of the dense aluminum nitride molded bodies produced from the deoxidized green bodies are adversely effected. The optimal amount of the carbon admixed with aluminum nitride starting powder of specific grain fineness and a given content of oxygen and carbon can be easily ascertained by performing deoxidation tests.

The process for producing deoxidized green bodies is as follows:

The AlN powder is first homogeneously mixed with the carbon-containing material which is preferably obtained by dissolving a carbon containing organic material in a solvent and dispersing the AlN powder in the solution. When free carbon per se is used, the AlN powder together with the elementary carbon can be dispersed in a solution of a temporary binder. Useful organic solvents, include acetone and lower alcohols having 1 to 6 C atoms. The dispersion can be carried out by stirring a dilute suspension in a plastic container using a stirrer or by kneading a viscous suspension in a kneading apparatus. The solvent can be removed, for instance, in the case of a dilute suspension, by spray drying or, in the case of a viscous suspension, by evaporation during the kneading operation. Generally, the dried material is milled in a jet mill, pin beater mill or ball mill to disintegrate agglomerates to ensure homogeneous distribution of the carbon-containing material in the admixture.

The starting powder mixtures are compacted by molding to form pre-molded green bodies. The molding can be effected by means of conventionally known steps such as die pressing, isostatic pressing or slip casting. In case of die pressing or isostatic pressing, a pressure between 10 and 200 MPa, preferably 50 to 100 MPa is generally applied.

The pre-molded green bodies are then subjected, according to the invention, to an deoxidation annealing under a nitrogen atmosphere at 1600° to 1800° C. The indicated temperature range is critical for obtaining the desired properties of the final product. It has been shown that under equivalent conditions but at lower temperatures, insufficient deoxidation was obtained and the residual oxygen content was above 0.35% by weight whereas at higher temperatures especially 1900° C., as a consequence of partial sintering, a noticeable grain enlargement occurred which is associated with a deterioration of the strength properties of the final product.

The deoxidation annealing of the pre-molded green bodies can be carried out in any desired high-temperature apparatus such as a graphite tube resistance furnace (Tammann furnace) or in an inductively heated furnace with graphite suszepfor. For continuous operation, there can be advantageously used a horizontal pusher or band-type furnace in which the pre-molded green bodies are transported through the hot zone of the furnace in a manner such that they can each be held at the desired temperature for a predetermined period of time. The time intervals for heating up and dwelling at the final temperature are here dependent on the size of the pre-molded green bodies to be deoxidized. The pre-molded green bodies are conveniently accommodated in graphite containers and surrounded by coarse-grained aluminum nitride powder to prevent carburization from the graphite container. But the pre-molded green bodies are preferably loaded in containers of aluminum nitride without using the surrounding powder bed of aluminum nitride. Nitrogen, optionally mixed with carbon monoxide, is used as the gaseous atmosphere. The deoxidation is advantageously carried out in a flowing nitrogen atmosphere that is, under a nitrogen pressure of about 0.1 MPa; but it can also be carried out under reduced $N_2$ pressure, a pressure of about 5000 Pa having proved especially satisfactory. The deoxidized green bodies obtained after the deoxidation annealing have, as a rule, a density of 55 to 65% Td, but in all cases $\leq$70% TD, that is, they are porous with open porosity whereby it is to be understood that they have canal pores which are intercommunicating and open to the surface of the article.

According to the present invention, these deoxidized green bodies consist of at least 99% by weight AlN, with residual oxygen and residual carbon contents preferably of less than 0.35% by weight each and with unavoidable metallic impurities preferably amounting to less than 0.3% by weight. The metallic impurities present in the aluminum nitride powder are exclusively from the preparation and further processing of the powder since no metal-containing sintering aids are intentionally added to the carbon containing aluminum nitride powder mixtures.

The deoxidized green bodies are used for the preparation of the substantially non-porous dense molded bodies of polycrystalline aluminum nitride. According to the invention, the deoxidized green bodies are isostatically hot pressed in an gastight casing at a temperature of from 1700° to 2100° C. and a pressure of from 100 to 400 MPa in a high-pressure autoclave using an inert gas as a pressure transfer medium.

For carying out the process of the invention, for preparation of the molded bodies, the deoxidized green bodies must be provided with a gastight casing before being introduced into the high-pressure zone so as to prevent the gas, used as the pressure-transmitting agent, to penetrate through the open pores into the body thereby hindering compression.

The casing must be formed from materials that can be sealed gastight and which at the applied pressing temperatures in the range of from 1700° to 2100° C. neither melt nor react with the deoxidized green bodies that is, they must remain inert in respect to the deoxidized green bodies. The casing must be sufficiently plastic at the pressing temperature used to adapt to the shape of the body without cracking to ensure that the gaseous pressure is uniformly transmitted via the casing to the body.

Examples of suitable casing materials that meet the requirements include high-melting glasses such as pure quartz glass, high-melting ceramics or high-melting metals and metal alloys like molybdenum, tantalum or tungsten. These materials can be used in the form of pre-fabricated casings or capsules in which the deoxidized green bodies are introduced. The casings together with the contents are then evacuated and sealed gastight. The casings can also be formed on the deoxidized green bodies by direct coating, for instance, by electroless deposition of metals or by applying a glass-like or ceramic-like composition, which is then melted or sintered in vacuum to form the gastight casing. In addition, it is preferred to apply between the casing and the deoxidized green body to be compressed, an intermediate layer. The intermediate layer can comprise inert powders, fibers or felts, for example, graphite felts and/or boron nitride powder. In addition, bodies provided with a casing of high-melting glass can be embedded in a powder bed of fine particulate material that serves to reinforce the glass casing from the outside. The expression "vacuumtight sealed casing" is intended to refer to a casing which is impervious to the pressure gas acting from the outside and which contains no residual gases that disturb the compression operation.

The deoxidized green bodies provided with gas-tight sealed casings are conveniently housed in graphite containers, then introduced in to the high-pressure zone and heated to the required compression temperature of at least about 1700° C. It is convenient here to separately regulate pressure and temperature that is, to raise the gaseous pressure only when the casing material starts to plastically deform at the elevated temperature. Argon or nitrogen are preferably used as inert gases for the transmission of pressure. The gaseous pressure applied is preferable within the range of 150 to 250 MPa reached by slow intensification at the final temperature used which is preferably within the range of 1800° to 2000° C. The optimal temperature within the range of 1700° to 2100° C. depends on the fineness and purity of the aluminum nitride starting powder used and on the chemical composition of the deoxidized green bodies. The maximum temperature of about 2100° C. should not be exceeded since there is danger that the non-porous molded bodies formed would acquire a "secondary recrystallized microstructure" that reduces the strength and is no longer homogeneous since some grains become larger than the rest.

After lowering the pressure and temperature, the cooled bodies are removed from the high-pressure autoclave and the casing is removed from the dense body.

The casing can be removed by milling or fusing the metal casing by sandblasting glass or ceramic casings or by chemical corrosion.

The molded bodies thus produced are substantially non-porous with a density of at least 99.8% TD and are substantially texture-free as result of the uniform multi-directional action of pressure that is, they have an isotropic microstructure and their properties are not dependent on direction but are substantially the same in all directions. The bending strength used for characterizing the high-temperature strength is not unfavorably affected by secondary phases at the grain boundaries by sintering aids. Bending strength values have been obtained which are $>500$ N/mm$^2$, preferably $>600$ N/mm$^2$ that are not substantially reduced up to 1400° C.

The absence of texture, the extremely fine-grained microstructure which is practically single phase with maximum grain size of 5 μm, preferably 2 μm, and the occurrence of a transcrystalline fracture mode are responsible for the excellent mechanical strength properties.

The fracture mode of the molded bodies is transcrystalline up to a temperature of about 1370° C. It is thus ensured that the grain boundaries do not provide a defect area for reducing strength that is, under stress at elevated temperature sliding of the grains at the grain boundaries is suppressed so that the molded bodies have high strength under long-term stress and a high creeping resistance. As result of their purity and of the practically 100% theoretical density, the molded bodies possess an extraordinary electrical insulating capacity corresponding to a specific electrical resistance of $10^{14}$ ohm×cm together with excellent thermal conductivity of at least 150 W/mK, preferably $>200$ W/mK.

Accordingly, molded bodies of polycrystalline AlN of the invention have a better range of properties than those produced according to known processes of pressureless sintering or hot pressing with or without use of sintering aids. The process for production of molded bodies by hot isostatic pressing is not as limited with regard to molding possibility as conventional hot pressing. A high pressure autoclave can contain a large furnace zone where numerous encased samples of any desired shape can be simultaneously hot isostatically pressed. From the hot isostatically pressed AlN bodies, thin substrate wafers can be produced at reasonable cost by conventional machining methods such as with an inner-hole saw. In particular, the combination of the following properties: high thermal conductivity, high electrical insulating capacity, low expansion coefficient and high thermal-shock resistance, recommends the material according to the invention made of dense, pure AlN for use as a substrate in high-efficiency electronics as, for example, as small mounting plates for semi-conductor elements or electronic circuits. The low specific weight, the good resistance to high temperatures and good thermal conductivity also make possible, however, their use as structural materials in high-temperature machinery such as engine construction.

The process for producing the molded bodies according to the invention is explained in detail with reference to the examples that follow. The relative densities in % TD given in the specification and in the examples for the molded bodies have been calculated on the basis of the theoretical density of 3.26 g/cm$^3$ of the aluminum nitride.

EXAMPLE 1

A technically pure AlN powder having a specific surface of 8.9 m$^2$/g was used as the starting material. The chemical analysis of this powder, which had a maximum particle size of 1 μm, is disclosed in Table 1. A commercially available, powdery phenol formaldehyde resin of the Novolak type (for instance AL-NOVOL ® of the firm Hoechst AG) was used as the carbon-containing material. To each 100 parts by weight of the AlN powder, 1.75 parts by weight of Novolak powder in the form of a solution in acetone were added and the viscous slurry was dried in air until the solvent had evaporated. The crumbly powder obtained after kneading was deglomerated by dry grinding in a jet mill and then isostatically compressed under a pressure of 100 MPa to cylinders 30ϕ×50 mm (30 mm diameter×50 mm height).

The cylindrical blanks were then annealed for two hours at 1800° C. under a flowing nitrogen atmosphere under a gaseous pressure of 0.1 MPa in an AlN crucible that had been introduced in the hot zone of a graphite furnace of the Tammann type. The annealing was carried out according to the following temperature schedule:

20°–400° C. : 60 min.
400°–1800° C. : 120 min.
kept at 1800° C. : 120 min. At the end of the dwell period, the furnace was switched off and the deoxidized green bodies were cooled in the furnace to room temperature. The deoxidized green bodies had a green density of an average 66% TD, a residual oxygen content of 0.29% by weight and a residual carbon content of 0.23% by weight. As shown in Table 1 which sets forth the analyses of the AlN starting powder and the deoxidized green body, practically no change occurs with regard to carbon content and metallic impurities whereas the oxygen content is drastically lowered from 1.80 to 0.29% by weight that is, above 80% based on the oxygen content of the starting powder.

TABLE 1

Analysis of the AlN sintering powder and of the green body deoxidized at 1800° C.

| Elements | AlN sintering powder (% by weight) | deox. green body (% by weight) |
|---|---|---|
| N | 32.9 | 33.8 |
| O | 1.80 | 0.29 |
| C | 0.21 | 0.23 |
| Fe | 0.139 | 0.210 |
| Si | 0.029 | 0.031 |
| Ca | 0.006 | 0.005 |
| Mg | 0.003 | 0.004 |

The deoxidized green bodies were then introduced into prefabricated quartz glass casings and the space between the inrer side of the casing and the green body filled with finely divided boron nitride powder. The casing together with the contents were then evacuated, heated to 1000° C. in vacuum and sealed gastight by melting in an oxyhydrogen burner. The encased samples were then hot isostatically compressed at 1800° C. in a high-pressure autoclave under an argon gaseous pressure of 200 MPa. The hot isostatic pressing was scheduled according to the following temperature/-pressure program:

20°–800° C./0.1 MPa : 60 min.
800°–1400° C./0.1 MPa : 60 min.

1400°–1600° C./0.1–125 MPa : 120 min.
1600°–1800° C./125–200 MPa : 120 min.
kept at 1800° C./200 MPa : 60 min.
1800°–1350° C./200 MPa : 60 min.
1350°–1250° C./200–5 MPa : 30 min.

After decompressing and cooling the molded bodies to room temperature, the samples were removed from the hot isostatic pressing equipment and the glass casings removed by crushing and sandblasting. The AlN molded bodies thus produced had a density totally of 3.26 g/cm$^3$, which corresponds to 100% of the theoretical density. After carring out the density measurements and surface grinding, cylindrical test bodies measuring 20$\phi$×28 mm and 20$\phi$×1 mm and prismatic small test bars 2×4×34 mm for determining the thermal conductivity, the specific electric resistance and the bending strength were produced from the molded bodies. The thermal conductivity was determined according to the comparative rod method up to 927° C. using Armco iron as the reference material. The thermal conductivity of the AlN samples in function of the testing temperature is given in Table 2.

TABLE 2

| Testing temperature | | Heat conductivity |
|---|---|---|
| (°C.) | (K) | (W/mK) |
| 27 | 300 | 161 |
| 177 | 450 | 101 |
| 327 | 600 | 76 |
| 477 | 750 | 61 |
| 627 | 900 | 50 |
| 777 | 1050 | 43 |
| 927 | 1200 | 38 |

A value of 10$^{14}$ ohm×cm was obtained for the specific electric resistance which was measured at room temperature (25° C.) with direct current according to the three-point measuring method. The bending strength of the test body was measured according to the four-point method using support distances of 15 mm (upper) and 30 mm (lower). The test bars, which break in a transgranular manner, had the following average bending strength value at room temperature (average value from 5 measurements): 621 N/mm$^2$. A value of 635 N/mm$^2$ was obtained for the bending strength of 1370° C. The microstructure of the samples was, according to results of x-ray and microstructural analyses, single phase with a maximum grain size of 2 μm.

EXAMPLES 2 AND 3 (FOR COMPARISON)

Example 1 was repeated with the variation that at one time, no carbon was admixed with the AlN powder (Example 2) and one time, an excess of carbon was admixed with the AlN powder (Example 3). The green bodies in Example 2 were pressed using 2% by weight camphor in the form of a solution in acetone as a temporary binder which was removed without residue during the heating operation in the deoxidation annealing step. Table 3 gives a characterization of the deoxidized green bodies and the properties of AlN bodies made therefrom by hot isostatic pressing in quartz glass casings, as indicated in Example 1.

As seen from the data in Table 3, by hot isostatic pressing of encased porous AlN green bodies made from the AlN powder without addition of carbon for deoxidizing the oxygen impurities, AlN bodies according to the invention are not obtained. Although the bodies are compressed to 100% of the theoretical density of AlN and possess excellent strength at room temperature; as a result of their high content of residual oxygen (see Table 3, Example 2), the values of heat conductivity, specific electrical resistance and high-temperature strength are clearly inferior to those of Example 1. The fractured surfaces of the samples show both at room temperature and at 1370° C. an intercrystalline rupture mode, which, together with the drastic drop of strength at 1370° C., can be ascribed to the presence of an oxygencontaining grain boundary phase.

It clearly appears from the results set forth in Table 3, for Example 3, that when a large excess of carbon is admixed with the AlN powder which in this case provided a carbon content of 0.62% by weight in the annealed green body, the AlN molded bodies according to the invention were likewise not obtained. Even though these bodies have low contents of residual oxygen and a transcrystalline rupture mode, the high levels of high-temperature and room-temperature strength, thermal conductivity and electrical insulating capacity, are not obtained in the dense AlN bodies.

EXAMPLES 4–5

Example 1 was repeated with the essential changes that follow:
(1) a different AlN powder with regard to purity and particle size was used;
(2) the carbon was in the form of elemental carbon;
(3) the deoxidizing annealing was carried out under a nitrogen atmosphere with a pressure of 5000 Pa and a final temperature of 1400° C. (Example 4) and 1700° C. (Example 5),
(4) the deoxidized green bodies were encased in vacuum sealed molybdenum capsules and finally
(5) 2000° C. was selected as the final temperature for the hot isostatic pressing.

The chemical analysis of the AlN sintering powder, which had a specific surface of 5.6 m$^2$/g and a maximum particle size of 3 μm, is shown in Table 4. Carbon black with a specific surface of 150 m$^2$/g in an amount corresponding to 0.63 g calculated on 100 g AlN powder was the elemental carbon used. To improve the pressability, in analogy to Example 2, the AlN-C mixture was further processed with a camphor solution to form a powder for pressing. Table 4 discloses the analyses of the AlN sintering powder and the deoxidized green bodies annealed at 1400° C. and 1700° C. The data in Table 4 shows that deoxidation annealing at 1400° C. (Example 4), contrary to Example 5, does not provide sufficient deoxidation. The deoxidation reaction stopped under the selected conditions with respective contents of residual oxygen and residual carbon above the required limit of 0.35% by weight.

The green bodies annealed at 1400° and 1700° C. were encased in vacuum-sealed molybedenum capsules by welding and after the hot isostatic pressing cycle which was carried out similarly as indicated in Example 1 but at a final temperature of 2000° C., opened with the help of an electron welding apparatus.

The hot isostatically pressed AlN bodies, after removing the bodies from the casing, were analysed with regard to their density, their microstructure and values for thermal conductivity and specific electric resistance, as already described in Example 1. The results of these measurements are set forth in Table 5.

TABLE 5

| Example No. | Density (% TD) | Heat conductivity at 25° C. (W/mK) | spec. electr. resistance at 25° C. (ohm · cm) | Grain size of microstructure μm |
|---|---|---|---|---|
| 4 | 100 | 90 | $10^{13}$ | <3 |
| 5 | 100 | 206 | $10^{14}$ | <4 |

Thus, according to Example 5, after practically complete deoxidation that is, by hot isostatic pressing of green bodies deoxidized down to contents of residual oxygen and residual carbon of ≦0.15% by weight, the thermal conductivity of non-porous polycrystalline AlN can be increased to more than 200 W/mK. The higher thermal conductivity obtained in the comparison of Example 1 can be attributed not only to the extremely low contents of non-metallic impurities (oxygen and carbon), but also to the degree of purity of the deoxidized green bodies of about 99.9% based on the metallic impurities.

The influence of the content of residual oxygen and residual carbon of more than 0.35% on the heat conductivity and electric resistance is clearly shown from a comparison of Examples 4 and 5. Despite the use of a very pure AlN sintering powder having a purity of more than 99.9% based on the metal impurities, an AlN body of the invention was no longer obtained in Example 4.

It is observed that pure AlN sintering powder can be compressed without using the hot isostatic pressing technique and without other additives which promote sintering according to the conventional (axial) hot pressing process with graphite dies which form non-porous AlN molded bodies having a density of 3.26 g/cm$^3$, but with thermal conductivities below 100 W/mK.

We claim:

1. A molded body of polycrystalline aluminum nitride having a density of at least 99.8% TD calculated on the theoretical density of pure aluminum nitride comprising:
    at least 99% by weight aluminum nitride,
    up to 0.35% by weight residual oxygen,
    up to 0.35% by weight residual carbon and
    up to 0.30% by weight total of metallic impurities (Fe, Si, Ca, Mg),
wherein the aluminum nitride is present in the form of an essentially single-phase, homogeneous, isotropic microstructure with a grain size of 5 μm maximum, the residual oxygen and the residual carbon being present in the form of a solid solution in the AlN lattice and not detectable as separate phase(s) up to a 2400-times enlargement, having the following properties: bending strength (measured according to the 4-point method) at room temperature and up to about 1400° C. of at least 500 N/mm$^2$, predominantly transcrystalline rupture module and a heat conductivity at 300 K of at least 150 W/mK.

2. A molded body according to claim 1 produced from a porous, deoxidized green body having a maximum density of 70% TD consisting of
    at least 99% by weight aluminum nitride,
    up to 0.35% by weight residual oxygen,
    up to 0.35% by weight residual carbon and
    up to 0.30% by weight total of metallic impurities (Fe, Si, Ca, Mg),
obtained by isostatic hot pressing said green body in a vacuum sealed casing at a temperature of from 1700° to 2100° C. and a pressure of from 100 to 400 Mpa in a high-pressure autoclave with an inert gas as a pressure transmitting agent.

* * * * *